Figure 1:
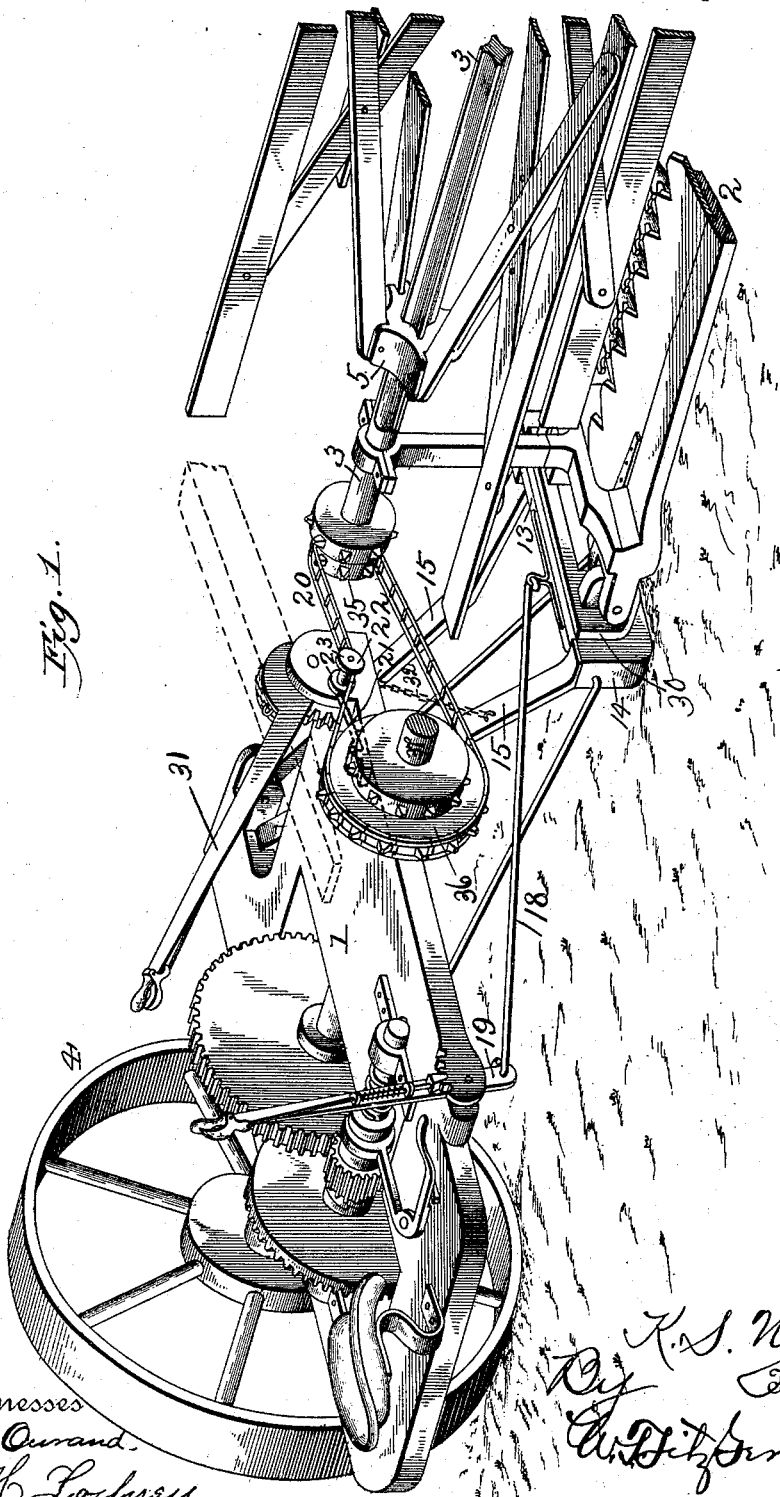

(No Model.) 2 Sheets—Sheet 1.

K. S. NYGAARD.
MOWER.

No. 474,798. Patented May 10, 1892.

Witnesses
F. L. Ourand
W. H. Lochrey

K. S. Nygaard, Inventor;
By A. Fitzgerald & Co.
Attorneys (No Model.) 2 Sheets—Sheet 2.
K. S. NYGAARD.
MOWER.
No. 474,798. Patented May 10, 1892.
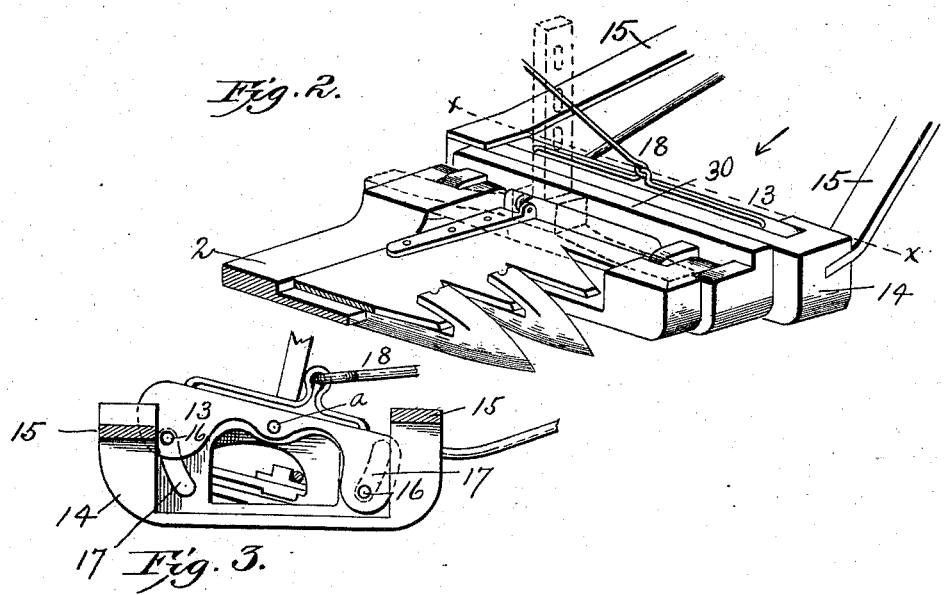

UNITED STATES PATENT OFFICE.

KNUT S. NYGAARD, OF KELLY'S, NORTH DAKOTA.

MOWER.

SPECIFICATION forming part of Letters Patent No. 474,798, dated May 10, 1892.

Application filed August 8, 1891. Serial No. 402,154. (No model.)

*To all whom it may concern:*

Be it known that I, KNUT S. NYGAARD, a citizen of the United States, residing at Kelly's, in the county of Grand Forks and State of North Dakota, have invented certain new and useful Improvements in Mowers; and I do hereby declare the following to be a full, clear, and exact description of the invention, such as will enable others skilled in the art to which it appertains to make and use the same.

My invention relates to improvements in mowers, and more particularly to the cutting apparatus thereof; and it consists in the peculiar construction, certain novel combinations, and the adaptation of parts hereinafter described and claimed.

In the accompanying drawings, Figure 1 is a perspective view of a mower embodying my invention. Fig. 2 is a detail perspective view of a portion of the cutting apparatus, and Fig. 3 is a longitudinal section taken in the plane indicated by the line *x x* on Fig. 2.

Referring by numeral to the said drawings, 1 indicates the main frame of a mower, which in general is of the ordinary or any approved construction and is mounted upon a transverse axle 37, which carries traveling wheels 4 at its ends, one of which is illustrated.

2 indicates the finger-bar.

Flexibly or pivotally connected to the forward portion of the main frame 1 are the laterally and downwardly extending bracket-arms 15, to the free ends of which is rigidly connected a traveling shoe 14, which is preferably formed from suitable metal and is designed to rest upon the ground when the mower is in operation. This shoe 14, which is preferably of a general rectangular form, as shown, is recessed in its sides and in the inner side of its end walls to receive the rock-lever 13, which is fulcrumed or pivotally mounted upon a pin or bolt *a*, which takes through the outer side wall of the shoe 14 and serves as a pivot for the outer rock-lever 30. The inner and outer rock-levers 13 and 30 are further connected adjacent to their ends by transverse bolts 16, which play in curvilinear slots 17, formed in the outer side wall of the shoe. The finger-bar 2 is provided on its inner end, adjacent to its forward and rear edges, with parallel ears, which are pivotally connected by transverse pins or bolts with lugs extending laterally outward from the outer rock-lever 30, whereby it will be perceived that when the levers 13 and 30 are rocked the cutting apparatus will also be rocked. Fulcrumed in the main frame of the mower, adjacent to the driver's seat, is a hand-lever 19, which is connected by a pitman 18 with the inner rock-lever 13, whereby it will be seen that the driver may readily rock the levers 13 and 30 and the cutting apparatus to raise the forward edge of the latter and avoid a stone or other obstruction.

By the provision of a rack-bar, as illustrated, in conjunction with the hand-lever 19, it will be further perceived that the rock-levers and the cutting apparatus may be set at various angles with respect to the ground and the latter may be adjusted to cut the grain at various distances above the ground.

Fulcrumed upon the forward portion of the main frame 1 is a hand-lever 31, which is provided with a segment upon its lower end, to which is connected one end of a chain 32, which has its opposite end connected to one of the bracket-arms 15, whereby it will be seen that through the medium of said lever 31 the cutting apparatus may be raised and lowered when desired.

Journaled in suitable standards rising from the finger-bar 2, adjacent to the ends thereof, is a shaft 3, upon which is mounted a reel 5, which may be of the ordinary or any approved construction. Fixed upon the inner end of the shaft 3 is a sprocket-wheel 35, which is connected by a sprocket-belt 20 with a sprocket-wheel 36, fixed on the axle or drive-shaft 37, which is preferably driven through the medium of suitable mechanism by the rotatory axle of the machine.

In order to take up the slack of the sprocket-chain 20 as the reel-shaft 3 is raised and lowered with the cutting apparatus, I provide the following automatic device: 21 indicates an arm, which is pivoted at its upper end in a bearing on the side of the mower-frame and has its lower end bent laterally at right angles. On the lower bent end of the arm 21 is loosely mounted a weighted roller 22, which is provided at its ends with flanges to prevent its lateral displacement off the sprocket-belt.

In operation it will be seen that the weighted roller 22 will rest upon the sprocket-belt near the middle of the same and that as the cutting apparatus is raised and lowered the weighted roller will press down on the belt, and thus automatically take up the slack therein and render the same stiff and taut.

Although I have specifically described the construction and the relative arrangement of the several elements of my improved mower, yet I do not desire to be confined to the same, as such changes or modifications may be made as fairly fall within the scope of my invention.

Having thus described my invention, what I claim, and desire to secure by Letters Patent, is—

In a mower, substantially as described, the combination, with the main frame, the shoe 14, having the curvilinear slots 17 in its side wall, and the bracket-arms 15, pivotally connected to the main frame, and a suitable means for raising and lowering said shoe, of the rock-lever 13, fulcrumed at its middle on a bolt $a$, extending through the side wall of the shoe, the rock-lever 30, also fulcrumed at its middle upon the bolt $a$, the transverse bolts 16, taking through the curvilinear slots of the shoe and connecting the rock-levers 13 and 30, and the finger-bar connected to the shoe 30, substantially as and for the purpose set forth.

In testimony whereof I affix my signature in presence of two witnesses.

KNUT S. NYGAARD.

Witnesses:
T. S. NYGORD,
T. E. P. NETTERSTROM.